United States Patent [19]

Heideman

[11] Patent Number: 4,488,508
[45] Date of Patent: Dec. 18, 1984

[54] AERATION/CIRCULATION METHOD AND APPARATUS UTILIZING LOW PRESSURE AIR

[76] Inventor: Robert C. Heideman, P.O. Box 1446, Apopka, Fla. 32704

[21] Appl. No.: 503,011

[22] Filed: Jun. 10, 1983

[51] Int. Cl.³ .......................... A01K 61/00; C02F 3/02
[52] U.S. Cl. .......................................... 119/3; 210/629; 210/170; 210/220; 210/232; 261/120; 261/122; 261/124
[58] Field of Search ...................... 210/220, 242.2, 170, 210/747, 199, 232, 620, 629; 261/120, 121 R, 124, 122; 47/1.4; 119/3, 5

[56] References Cited

U.S. PATENT DOCUMENTS

| | | | |
|---|---|---|---|
| 2,960,321 | 11/1960 | Stoots | 43/57 |
| 3,006,476 | 10/1961 | Haplert | 43/57 |
| 3,083,895 | 4/1963 | Welles | 43/57 |
| 3,189,334 | 6/1965 | Bell | 43/57 |
| 3,320,928 | 5/1967 | Smith | 43/57 |
| 4,215,082 | 7/1980 | Danel | 210/242.2 |
| 4,240,376 | 12/1980 | Kominami | 119/3 |
| 4,287,062 | 9/1981 | von Nordenskjöld | 210/242.2 |

Primary Examiner—Ernest G. Therkorn
Attorney, Agent, or Firm—Julian C. Renfro

[57] ABSTRACT

A low pressure valveless floating aeration system for providing oxygen and circulation to a water impoundment, utilizing one or more floating elongate members supporting a substantially uniform assemblage of air diffusers spaced above the bottom of the impoundment. Air at a comparatively low pressure is supplied to said elongate members and thence to said air diffusers, such that a large number of tiny bubbles will rise up from the air diffusers through the water of the impoundment, bringing about a desirable amount of circulation in the water. Because the air diffusers are suspended from members floating on the water surface, the depth at which the diffusers are located can be made uniform, or the diffusers can be suspended at gradually decreasing depths at locations remote from the air supply.

7 Claims, 6 Drawing Figures

AERATION/CIRCULATION METHOD AND APPARATUS UTILIZING LOW PRESSURE AIR

BACKGROUND OF THE INVENTION

It is known that a body of water such as a tank, pond, pool, lake, bay, canal or marina may require the addition of oxygen, or other gas for the raising of fish, shellfish, algae, or other cultured specie. The water body may also require aeration for the bacterial digestion of waste as in sewage treatment, or in order to raise the amount of oxygen near the bottom to water quality standards as set by regulatory agencies. A body of water may also require aeration if it has become either eutrophic or stagnant, or if it contains a high level of unwanted or toxic gas. It is therefore often necessary to aerate, agitate, or circulate water in water impoundments to obtain the desired gas content, water quality, mixing action, or destratification.

Many techniques already exist for oxygenating, aerating, gas stripping, and mixing water and other liquids. Some methods use large motor-driven propellers for bringing about oxygenation, but these are quite expensive to purchase and to maintain. Gas diffusion or sparging is another method which is well known in the fields of aquaculture, wastewater treatment, and pond care. However, these prior attempts proved to be particularly expensive in large, shallow bodies of water. Costs rose with the large expenditure of energy required per unit area, logistical complexity, maintenance requirements, multiple electric motors and associated wiring, and the high air pressures required.

A further increase in the expense of harvesting the aquaculture crop is encountered if traditional aeration devices have been used. In harvesting, a large net must be drawn through the pond, requiring the prior removal of the aeration device(s). In addition, the operation of conventional aeration devices residing on the bottom of the pond may cause the formation of craters or indentations in the pond bottom that would enable fish to escape capture by the net. Because of factors such as these, and because the profit margin in aquaculture is small, it has not been possible before the present invention to evolve a cost effective method of aerating and maintaining large aquaculture ponds, such as the shallow ponds in which catfish and shrimp are grown, as will enable higher stocking densities and reduced mortalities, and obviate the need for mechanical aeration on an emergency basis.

It is a known fact that circulation can be induced in a deep body of water, by the use of submerged air diffusers, propellers, or other devices which create mixing currents that cover a broad area, creating a large "sphere of influence" leading to good aeration. However, the aforementioned air diffusers used in shallow bodies of water produce comparatively small spheres of influence, for equivalent energy inputs. This situation results from the increased resistance to horizontal flow as the water becomes shallower. In shallow water many more devices are required per unit of surface area in order to create the mixing currents, essential to successful catfish farming.

It has been shown experimentally (Parker, U.S. Fish and Wildlife) that 16,000 pounds of catfish can be raised per surface acre of water with the use of continuous aeration. This, however, cannot be justified commercially because the cost of aeration is greater than the increased profits realized from the sale of the additional fish. Some aeration devices which have been tried in large ponds are typical of those used in the waste water treatment industry and show little promise to the aquaculturist because of the vastly different conditions—namely, the need for vertical circulation over a large shallow area. Very little continuous aeration is currently utilized by catfish farmers except on an experimental basis. Emergency aeration, however, is used to prevent fish kills when such kills appear to be imminent. The commonly accepted maximum figure for the number of pounds of catfish able to be grown without continuous aeration (but with emergency aeration available) is approximately 5,000 pounds per acre.

As will be seen hereinafter, it is the purpose of this invention to provide aeration at such a low cost as to enable 9,000 pounds or more of catfish to be grown per acre, with an energy input of only 300 Watts per acre. Catfish farmers might thereby realize far greater profits than by utilizing the teachings of the prior art. Catfish are used here only as an example, and there is an equally dramatic increase with other species.

Many catfish farmers have gone to the expense of creating aeration arrangements involving numerous lengthy submerged pipes or tubes that serve to deliver air under pressure to an array of diffuser devices residing on the bottom of the pond, or other body of water. However, the shallow diffusers and the diffusers near the air source tend to deliver a disproportionately large amount of the supplied air to a comparatively small segment of the pond, while remotely located diffusers are starved for air. Consequently remote parts of the pond are not aerated properly.

Fish farmers have tried in the past to cope with this problem by several different techniques, including the use of dropping orifices, valves, or the like in an attempt to apportion the air properly. However, this increases expense and complexity, and raises significantly the pressure level needed at the air pump in order to assure that each submerged diffuser receives an appropriate amount of air. Other efforts to apportion air properly have included:

1. The use of enough submerged pipes or tubes so that each diffuser, or each small group of diffusers, will have a private air supply;
2. Perfect leveling of all diffuser devices with air manifolds of inordinately large diameter to minimize pressure drop between diffusers; and
3. Having high resistance to air pressure in each diffuser or orifice (as used by Hinde Company, Highland Park, Ill.) thereby minimizing the pressure differences between diffusers fed from a common supply line.

However, not only are these expensive, but also it is a great hinderance at the time the fish are to be harvested, because of the substantial obstruction presented to the use of nets.

Another important disadvantage of the submerged system is its dependence upon the pond having a relatively uniform bottom contour. The depth at which certain diffusers reside, if different from the depth of the other diffusers, brings about the need for the use of line restrictions such as dropping orifices or the like, which not only increase expense, and are prone to clog, but also more importantly, they force the aquaculturist to use the high pressure system, with its attendant and distinct disadvantages.

It was in an effort to obviate these and other severe problems that I developed the novel low pressure aeration system described hereinafter that has proved exceedingly cost effective.

SUMMARY OF THE INVENTION

Unlike the prior art aeration methods which involved high pressure systems requiring a considerable amount of horsepower, the present invention utilizes a number of low cost air diffusers that are suspended from the underside of a floating array of pipes or tubing, such as of polyethylene plastic. The floating pipes or tubing ideally are used in a spaced array on the surface of a pond or the like, with the aeration diffusers suspended above the bottom from spaced locations, say ten feet apart along the undersides of the floating tubing. The floating tubing is supplied with continuous quantities of low pressure air by the use of a blower, such as of a low horsepower, oil-less type, with the result being that a large number of tiny bubbles are caused to evolve uniformly from each of the numerous air diffusers that are utilized in a given pond.

Although some oxygenation of the water in the pond will occur directly from the bubbles themselves, in a larger sense, the steady flow of bubbles from each diffuser serves in a highly advantageous way to create circulation of the water from the depths toward the surface of the pond. The large number of tiny bubbles thus prevents stratification and stagnation of the water in the pond, and the induced circulation permits oxygen transfer from the atmosphere above the pond to the water.

As mentioned above, for a given amount of air used per minute, air diffusers in a deep pond will create more circulation than they will in a comparatively shallow pond. Therefore the most efficient utilization of energy will be realized from the use of a number of smaller devices. As will be discussed at greater length hereinafter, I have found that small, low volume air diffusers used at a rate of approximately 60–120 diffusers per acre and suspended at a depth of 2 feet to 4½ feet will bring about an entirely satisfactory amount of circulation, and greatly increase the ability of the aquaculturist to grow his crop economically.

It is therefore a principal object of this invention to provide a low pressure system for the aeration of a pond or other body of water, in order that fish, such as catfish, or other such products can be grown in a highly economic manner.

It is another object of this invention to provide a low cost, yet highly advantageous way of increasing the circulation of water in a pond, such that it will interface with ambient air very effectively, permitting oxygen to enter the water and allowing toxic gases to escape.

It is yet another object of my invention to create a low pressure, highly effective floating circulation system for a pond or other body of water utilizing only inexpensive, readily available components, that can be easily removed at the time the crop is harvested.

It is still another object of this invention to provide a floating water circulation-inducing arrangement for a crop-producing pond or other impoundment in which a series of air diffusers can be disposed in optimum depth relationships, such that a proper apportionment of low pressure air between the diffusers will be readily accomplished without the need for periodic adjustments, and without the need for mechanical devices to assure desired air flow to each diffuser.

It is yet still another object of my invention to provide a novel method of providing oxygen and circulation to a water impoundment utilizing one or more spans of floating tubing supplying air to diffusers suspended below the surface of the water.

These and other objects, features and advantages will be more apparent as the description proceeds.

DETAILED DESCRIPTION

Figure 1:
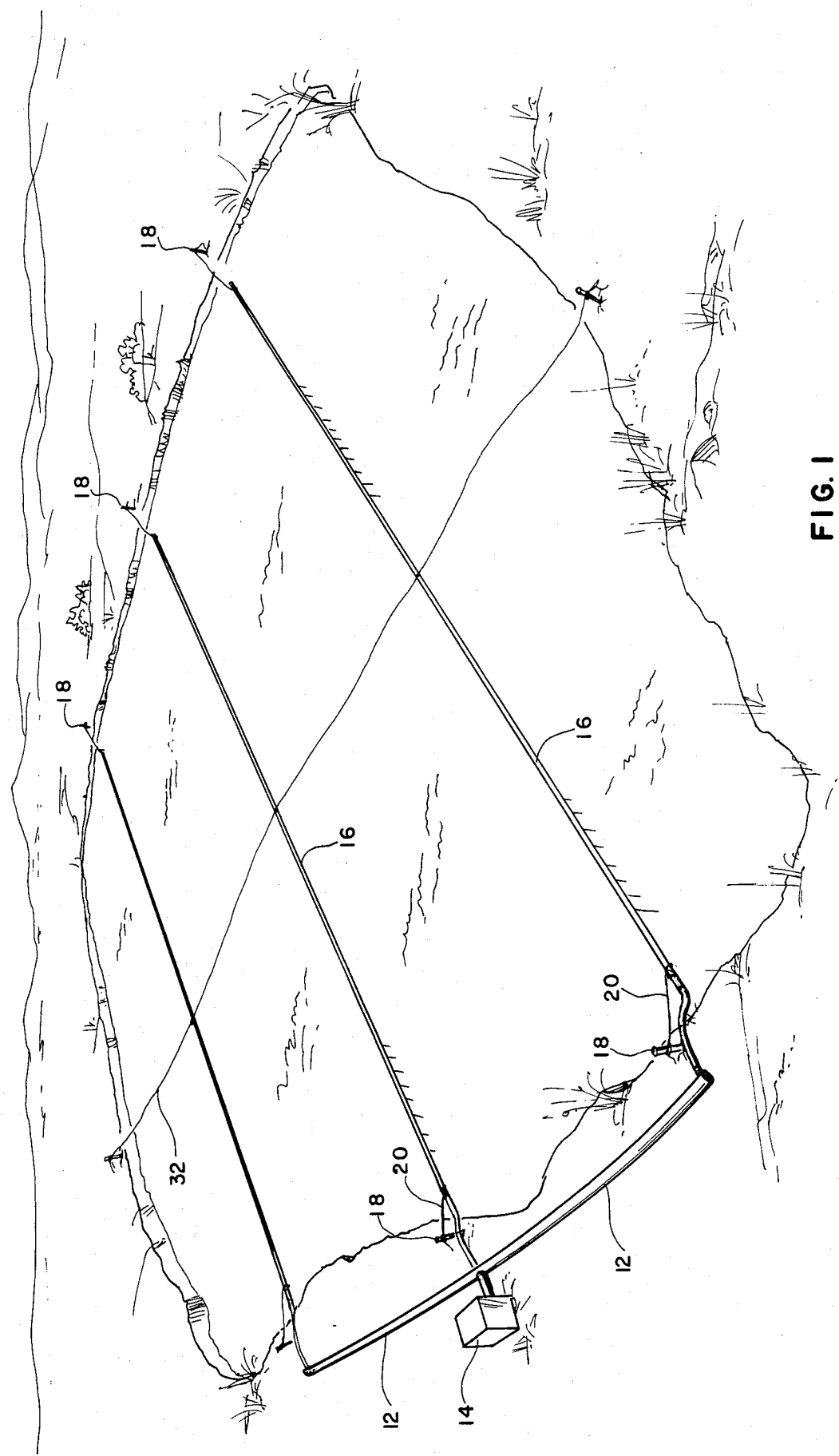
FIG. 1 is a somewhat idealized showing of a typical catfish pond in accordance with this invention, in which a number of floating pipes or tubes are shown, with numerous air diffusers being suspended several feet therebelow and from which diffusers, air in the form of tiny bubbles can issue.

Turning first to FIG. 1, it will be seen that I have there illustrated a typical pond 10 equipped with certain selected components in order that a low pressure aeration system in accordance with this invention is created, such as for the growing of fish, for example, catfish. Although multiple blower-header arrangements may be used to supply adjacent ponds, I have for illustration utilized here only a single header 12. The single header is typical of the arrangement in the case of a 1 hectare pond, which is 2.471 acres, even up to 10 or more hectares. This header is supplied with air by means of a blower 14, preferably electrically powered. The header 12 is usually buried on the bank of a pond, and one or more sections of tubing 16 extend outwardly therefrom. The tubing floats on the surface of the pond, and is held against the wind by the use of mooring stakes 18 and mooring ropes 20.

Inasmuch as aeration in accordance with this invention can advantageously be accomplished at low pressure, typically not exceeding 2.5 pounds per square inch above atmospheric, the blower can be a low horsepower, low maintenance device of an oil-less type. Preferably, I use a blower made by Spencer Turbine Company of Windsor, Conn., and powered by 110 or 220 volts, although I am obviously not to be limited to this. The blower is connected to the header 12 by suitable hollow connectors, such as of a type discussed hereinafter, and because of the low pressure involved, the header can be made of thin walled pipe.

Figure 5:
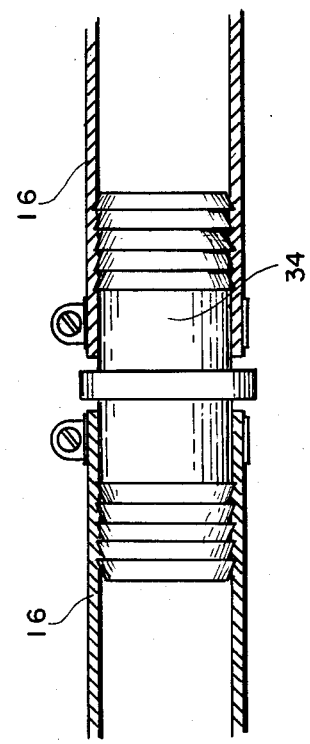
FIG. 5 is a typical detail of the manner in which an adjacent pair of floating pipes are joined together.

One of the important aspects of this invention is the use herein of the plurality of tubes or pipes 16, which are designed to float in a spaced array on the surface of a pond or other body of water. Ideal for this use is thin walled, ultraviolet inhibited polyethylene tubing, which is readily available in 100 foot and 400 foot lengths, and manufactured and marketed such as by Oil Creek Plastics of Titusville, Pa. The ability of this thin piping to float is consequential to this invention in that it can easily support a plurality of air diffusers 22, suspended below the piping by means of short vinyl tubing 24, through which tubing the air is supplied to the diffuser; note FIG. 6. For the typical 20 acre catfish pond, several of the 100 foot sections of polyethylene pipe may be joined together to form each span of pipe, as shown in FIG. 1. FIG. 5 illustrates a typical joining technique, using a connector 34 held in place by a pair of clamps. A suitable plug is used to close off the far end of each span of pipe.

Figure 2:
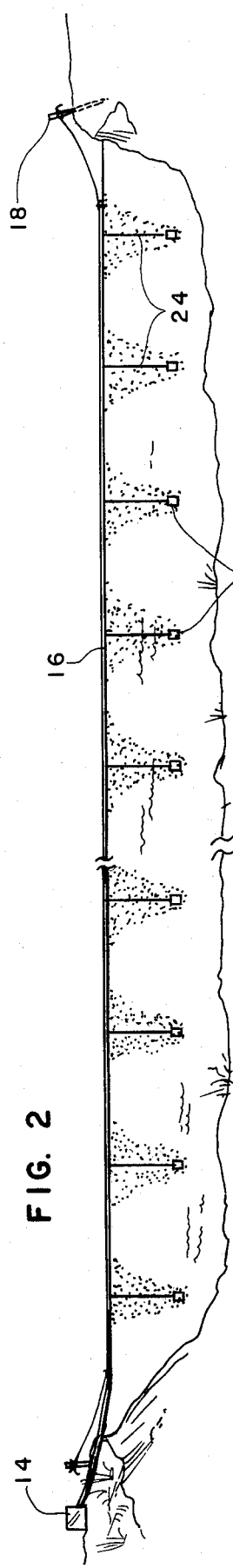
FIG. 2 is a side elevational showing of a typical catfish pond, revealing the use of numerous air diffusers placed at a consistent depth, with a large number of tiny bubbles of air issuing from each air diffuser.

FIG. 2 reveals a typical section of pipe or tubing, which is usually maintained in a designated position on the surface of the pond by the use of stakes 18, one on each bank of the pond. Mooring lines 20 are utilized to tie the ends of the pipe 16 to the stakes, thus making the arrangement relatively immune from displacement due to wind forces and the like. Guy ropes perpendicular to the floating tubing, such as shown at 32 in FIG. 1 may be used to help keep the sections of tubing 16 in the desired position on the surface of the body of water. For the typical catfish pond, a number of installations equivalent to that illustrated in FIG. 2 are utilized, with the spans of pipe or tubing being spaced approximately 100 feet apart, although this distance may of course vary.

Figure 4:
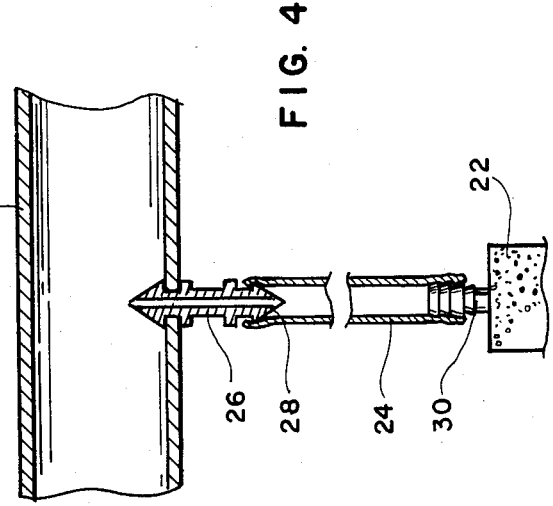
FIG. 4 is a showing of the inexpensive manner in which a typical air diffuser is attached to a floating pipe.

At intervals along each pipe or tube 16, such as every 10 feet or so, air diffusers 20 are to be located below the surface of the pond, these air diffusers serving, when supplied with air, to bring about highly successful aeration of the water in the pond. At each intended location of an air diffuser, I puncture the underside of the tube or pipe 16, and then install in each of the holes so made, a low cost plastic insert 26 having a head configuration such that it can be removed from the pipe 16 only by the expenditure of considerable effort; note FIG. 4. The inserts 26 are available from RIS of Sanford, Fla.

Each insert 26 has a hole therethrough, and a nipple portion 28 on its lower end, onto which one end of a relatively short hollow connector in the form of tubing 24, such as of vinyl, may be inserted. Inasmuch as the typical pond for the raising of catfish seldom exceeds 4 to 5 feet in depth, and each air diffuser 22 supported by the hollow connector 24 below the pipe 16 is to reside above the bottom of the pond, each piece of tubing 24 is ordinarily about 3 feet to 4 feet in length. A suitable nipple 30 is formed on top of each air diffuser and because this nipple as well as nipple 28 are suitably configured and dimensioned with respect to these hollow vinyl connectors, once the ends of the hollow connector 24 are inserted over the nipples, no clamps or glue to hold the tubing onto the nipples are ordinarily necessary.

Figure 6:
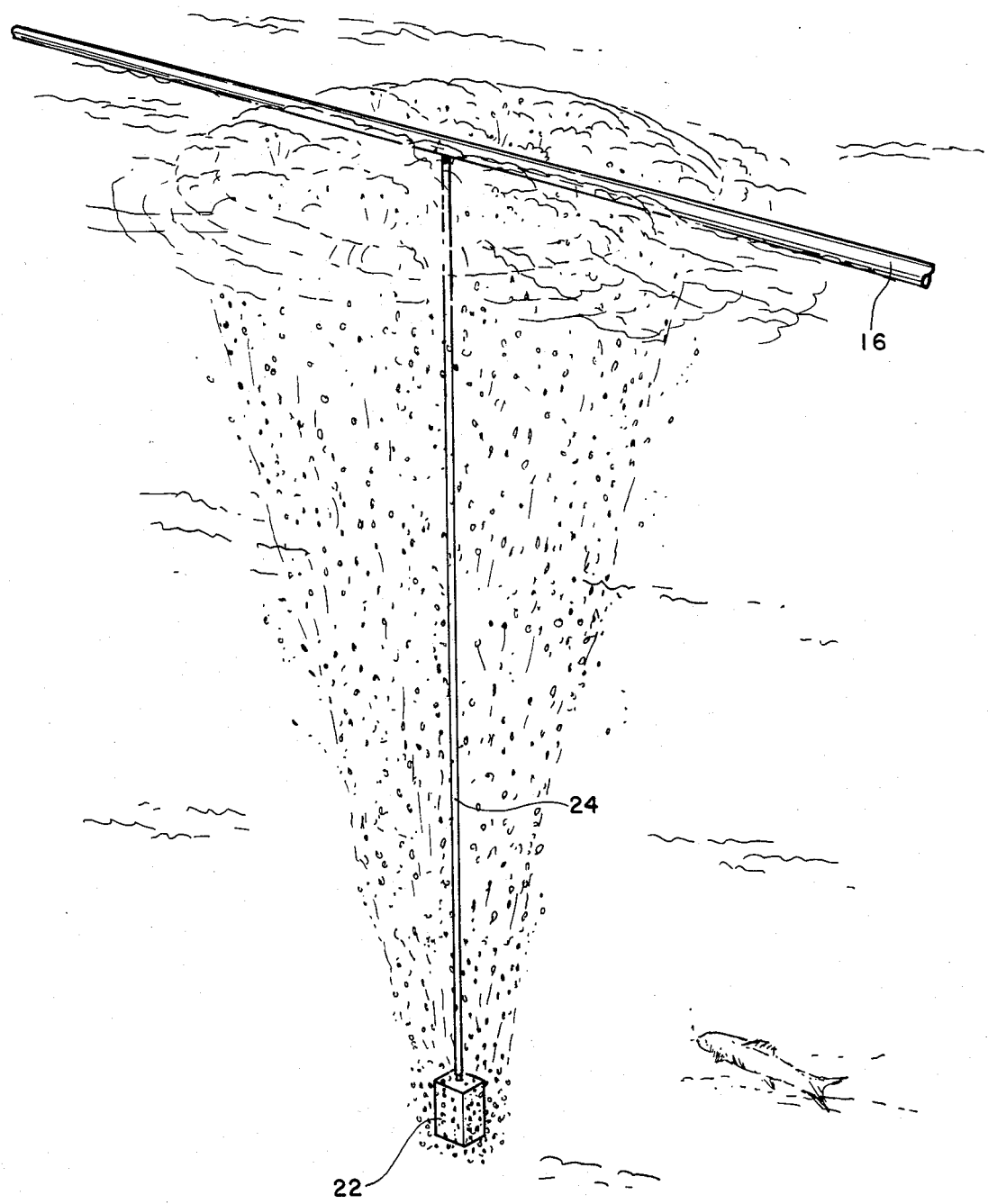
FIG. 6 is a showing to a larger scale of a preferred air diffuser, from which issues a large number of tiny bubbles that serve to induce vertical circulation.

The air diffusers 22 I prefer to use, as shown in some detail in FIG. 6, are made of silica bonded with glass dust, and during the construction of these components, they are heated until the glass melts and bonds the silica particles together in such a way that a very large number of tiny passages are created in each diffuser. Since the glass bonds at approximately 2,000° Fahrenheit, these components (such as manufactured and marketed by Aquatic Eco-Systems Inc. of Apopka, Fla.) will not break down, even in harsh environments. It is worthy of note that the blower 14 was chosen to be of an oil-less type, for air containing oil vapor will act as a pollutant to the water. The pores I prefer for each air diffuser are 140 microns in diameter, which produce very little resistance to air flow, and result in a creation of air bubbles 1 to 3 millimeters in size. A distinctive, slightly domed boil area is usually located over each of my air diffusers when the air blower is in operation.

As best seen in FIG. 6, the air diffusers 22 that I prefer to utilize may be of a size 1"×1"×2" and act to increase the surface area of the volume of compressed air or other gas by dividing it into small bubbles. The oxygen transfer coefficient is increased and a circulation pattern is induced by the rising bubbles/water column. Gases are exchanged between the bubbles in the water as well as between the water surface and the atmosphere in the boil area. Often, the surface boil will account for more gas transfer than do the bubbles themselves. Bubble size and spacing are important for efficiency. In other words, these air diffusers serve to minimize bubble coalescence and to increase lift, thus to bring about vertical circulation. The air diffusers I use are ideal for use in wastewater treatment and aquaculture because they will remain maintenance free for a minimum of six months. When cleaning becomes necessary, this is easily accomplished by immersing the air diffuser stones in acid for a period of time.

From the numerous air diffusers used for each pond (or other body of water) a very large number of tiny bubbles of air (or other selected gas) are evolved, and this brings about the highly advantageous vertical circulation. If fish are being grown in the pond, the numerous tiny bubbles bring about circulation of the water in the pond, with attendant increase in oxygen and removal of toxic gases from the water. Because low pressure air, such as 2.5 lbs. per square inch above atmospheric is very inexpensive to produce, my method of aeration using diffusers supported from floating components is very cost effective.

As may be seen from this, it is necessary to utilize a larger number of air diffusers in a shallow pond, than in a deep pond. The optimum number of diffusers to be used per acre will be determined in a given situation by the cultured species' oxygen requirements, the temperature, the stocking density, the amount of feed added, the age of the pond, etc. Normally I supply approximately 16 cubic feet of air per minute per acre, but the amount may vary between 12 cfm/acre and 24 cfm/acre.

As previously mentioned, I have found that the principal benefit associated with the creation of the large number of tiny bubbles and the large number of small air diffusers used per pond is the substantial circulation brought about in the body of water, permitting a very effective gas exchange with the atmosphere. The direct transfer of oxygen to the water by the bubbles alone is surprisingly small, often as low as 1%.

In no event do I need to resort to the high pressure systems of the prior art, where proper operation of each diffuser could be achieved only by the extensive use of line restrictions, such as valves or dropping orifices.

Unlike the high pressure systems of the prior art, which used a relatively small number of diffusers per pond and each of the diffusers was of a much larger size, I have found that the principal benefit associated with the large number of small air diffusers I use is the substantial circulation brought about all across the body of water, which leads to the highly satisfactory gas exchange with the atmosphere.

The circulation my equipment brings about in the water serves to destratify the body of water, and to successively bring large quantities of deep water to the surface, thus serving to oxygenate the water by its interface with ambient air. The benefit to the aquaculturist is quite remarkable in many instances in that for a small outlay of money, he can bring about a considerable increase in the number of fish grown per acre, eliminate the need for emergency aeration equipment, and greatly reduce much of the time normally spent on monitoring oxygen levels to determine when emergency aeration equipment is required.

For the catfish farmer, the oxygenation of a pond is not per se new, but rather the true benefit taught herein, largely relates to the economics of the process. In accordance with the teachings of the prior art, the oxygenation was brought about only after the outlay of considerable sums for the headers that will carry high pressure; the weighted, submerged supply pipes; the more expensive high pressure blowers; and the additional electricity for powering the larger blowers. In contrast, my low pressure system, involving floating air supply tubes, brings about effective circulation at a low cost, can be operated for a few hours per day, or continuously if necessary, at a very low per hour cost.

Furthermore, my system does not necessitate the laborious effort of installing "T-joints" in the air supply pipes at the location of each air diffuser, as has been required in the high pressure systems of the prior art.

Another advantage of my invention resides in the ease with which harvesting of the aquaculture crop can be brought about. In prior art aquaculture arrangements, in which sunken pipes supplied air diffusers resting on the bottom of the pond, declivities and holes were often created, giving the animals a place to hide at the time harvesting by the use of nets was brought about. As is obvious, my air diffusers, suspended at an ideal depth for floating pipes, do not in any way cause the bottom of the pond to become pitted or irregular, and perhaps even more importantly, they can be readily placed at optimum depths.

Figure 3:
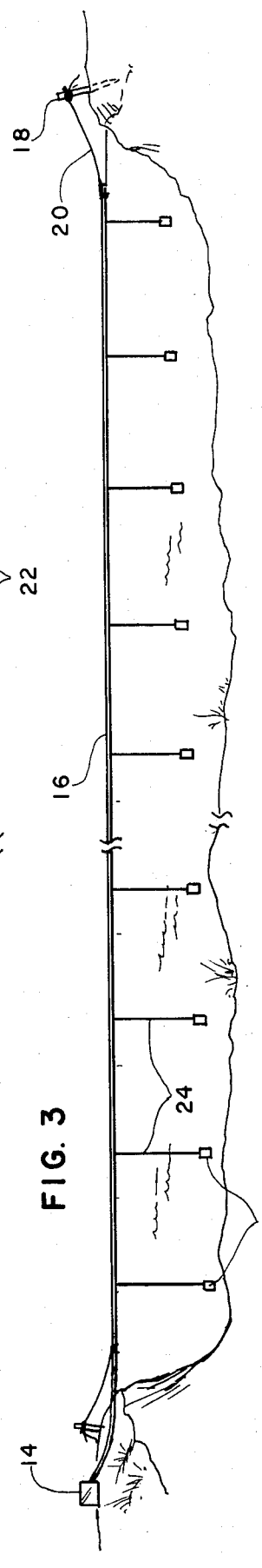
FIG. 3 is a showing to the same scale as FIG. 2, but with the air diffusers at graduated depths, such that the diffusers nearest the air supply are the deepest, and with the diffusers farthest from the air supply at the least depth.

As shown in FIG. 2, it is but a simple matter to place all the air diffusers 22 at a uniform depth, which for example can be approximately four feet deep, although I obviously am not to be limited to this. On the other hand, and as shown in FIG 3, the diffusers at the remote end of the pond from the air supply can be placed at a slightly shallower depth, thus to compensate for line pressure loss. The hollow vinyl connector members 24 depicted in FIG. 3 may be utilized in graduated lengths in order to cause the air diffusers to be in the desired relationship, and the length difference between the tubing members 24 at opposite ends of a one thousand foot span of pipe can be approximately twelve inches.

It should be noted that for some very shallow ponds, the length of the hollow connectors 24 can be as short as twelve inches.

Costs can be reduced somewhat by utilizing tubing members 16 of somewhat smaller diameter on the far end of the span from the header 12. Such of course necessitates the use of connectors 34 of somewhat different configuration than that shown in FIG. 5.

Typical pressure loss for my low pressure system is only approximately one-half pound per square inch over a 1000 foot span. In contrast, the typical high pressure system of the prior art had at least a two pound per square inch loss, typically more, and as a result, spans much longer than say 500 feet became impractical.

I have found that ten foot spacings between my air diffusers on a given span of pipe is optimal, for then no substantial amount of overlapping between the "spheres of influence" of adjacent diffusers occurs. However, I obviously am not to be limited to this spacing. On the other hand, adjacent spans of pipe can be substantially further apart than ten feet, and I have found that sufficient vertical circulation for a shallow body of water often can be brought about even if the essentially parallel spans of pipes are spaced up to say one hundred feet apart.

At the time harvesting of the catfish (or other crop) is to be brought about, it is but a simple matter to detach the cords or ropes from the stakes 18, preparatory to pulling all the pipes 16 to one side of the pond. The one or more guy ropes 32 used at appropriate locations to prevent the wind or other factors from causing the displacement of the pipes 16 from the desired location may be pulled on in such a way as to cluster the floating pipe array in a location readily permitting harvesting of the fish, such as by the use of nets.

As should now be clear, I have shown and described a highly advantageous method and apparatus for growing fish on a commercial basis in large ponds, involving inexpensive components, low supply pressure, and very moderate outlay for running expenses.

I claim:

1. A low pressure valveless floating aeration system for providing oxygen and circulation to a water impoundment of substantial size in which aquaculture may be pursued, comprising an air blower, at least one essentially continuous elongate floating member at least fifty feet long, and having a hollow interior, which elongate member floats on the water surface when air from said blower is supplied thereto, a plurality of porous air diffusers suspended in a spaced relationship by hollow connectors from said floating member, said air diffusers disposed relatively near to said air blower being suspended deeper than those remote from said blower, a hollow insert at the upper end of each of said hollow connectors functioning to supply air from said floating member to said diffusers, said inserts being readily connected to said floating member at desired intervals without any severing of said floating member, and with negligible increase in the impedance to air flow through said floating member, such that low pressure air supplied by said blower is caused to issue as tiny bubbles from said diffusers from selected locations below the surface of the body of water.

2. The low pressure aeration system as recited in claim 1 in which said floating member is of substantial length, and made up of a plurality of tubing portions joined together, with the interior diameter of said tubing portions being essentially constant.

3. The low pressure aeration system recited in claim 1 in which said air diffusers are made of silica bonded with glass dust, having pores approximately 140 microns in size.

4. The low pressure aeration system as recited in claim 1 in which said air blower supplies air to a header, and two or more elongate floating members equipped with a plurality of diffusers are connected to said header, each at essentially right angles to said header.

5. A low pressure valveless floating aeration system for providing oxygen and circulation to a water impoundment of substantial size in which aquaculture may be pursued, comprising an air blower, at least one elongate floating member of substantial length, and made up of a plurality of tubing portions joined together, said floating member having a hollow interior, with the interior diameter of said tubing portions decreasing with distances from said blower, which elongate member floats on the water surface when air from said blower is supplied thereto, a plurality of porous air diffusers suspended in a spaced relationship by hollow connectors from said floating member, a hollow insert at the upper end of each of said hollow connectors functioning to supply air from said floating member to said diffusers, said inserts being readily connected to said floating member at desired intervals without any severing of said floating member, and with negligible increase in the impedance to air flow through said floating member, such that low pressure air supplied by said blower is caused to issue as tiny bubbles from said diffusers from selected locations below the surface of the body of water.

6. The low pressure aeration system as recited in claim 5 in which said air diffusers are made of silica bonded with glass dust, having pores approximately 140 microns in size.

7. The method of providing oxygen and circulation to a water impoundment in which aquaculture may be pursued, comprising the steps of selecting an essentially continuous length of tubing of a type which floats on the surface of the water of the impoundment when filled with air, creating apertures on an underside portion of such tubing at spaced locations, placing a hollow insert in each of said apertures, connecting short pieces of small diameter tubing between one and five feet in length to said hollow inserts, attaching an air diffuser to the lower end of each of said short pieces of tubing, such that each air diffuser is suspended below the surface of the water, and supplying air to one end of said length of floating tubing, to cause numerous bubbles of air to issue from said air diffusers, and thereafter rise up through the water of the impoundment, the air diffusers disposed relatively near to the air supply being suspended deeper than those remote from the air supply.

* * * * *